United States Patent [19]
Park et al.

[11] Patent Number: 5,508,858
[45] Date of Patent: Apr. 16, 1996

[54] POWER TRANSFERRING DEVICE FOR MAGNETIC RECORDING AND REPRODUCING APPARATUS USING AN ELECTROMAGNETIC PLUNGER

[75] Inventors: Gun C. Park; Do Y. Choi; Jae K. Seo, all of Suwon, Rep. of Korea

[73] Assignee: Samsung Electronics Co., Ltd., Kyungki-do, Rep. of Korea

[21] Appl. No.: 280,457

[22] Filed: Jul. 26, 1994

[30]     Foreign Application Priority Data

Jul. 30, 1993 [KR]   Rep. of Korea ...................... 93-14671

[51] Int. Cl.⁶ ................................................. G11B 15/00
[52] U.S. Cl. ............................................................ 360/85
[58] Field of Search .............................. 360/85, 95–96.5

[56]                 References Cited
              FOREIGN PATENT DOCUMENTS

WO9321631  10/1993  WIPO .

Primary Examiner—Robert S. Tupper
Assistant Examiner—Brian E. Miller
Attorney, Agent, or Firm—Sughrue, Mion, Zinn, Macpeak & Seas

[57]                 ABSTRACT

A power shifting device for a magnetic recording and reproducing apparatus. The power transferring device includes a transmitting gear which is capable of being switched to selectively transmit the power of a capstan motor to the loading system or to the running system. The lower portion of the shaft of the transmitting gear is switched along a groove of the main chassis so as to be guided along the opposite walls of the groove to the exact position, so that the power is selectively transmitted to the loading system or to the running system of the apparatus.

3 Claims, 3 Drawing Sheets

POWER TRANSFERRING DEVICE FOR MAGNETIC RECORDING AND REPRODUCING APPARATUS USING AN ELECTROMAGNETIC PLUNGER

BACKGROUND OF THE INVENTION

1. Field of the Invention

The present invention relates to a power transferring device for a magnetic recording and reproducing apparatus, in which the power of a capstan motor is properly distributed to a loading system and to a running system.

2. Description of the Prior Art

Generally, a magnetic recording and reproducing apparatus is capable of recording or reproducing a signal on a running magnetic tape. Such a magnetic recording and reproducing apparatus includes a drum with a head installed on a deck, a tape running device for carrying a magnetic tape through a predetermined path between a supply reel and a take-up reel, a tape loading device for closely contacting the magnetic tape to the drum, and a device for driving the reels. Also included are a loading motor for driving the tape loading device and a capstan motor for driving the tape running device and the reels.

Recently, the size of magnetic recording and reproducing devices is becoming gradually miniaturized. In particular, the demand for a miniaturized magnetic recorder/reproducer deck is increased by the advent of the super compact pocket-size camcorder. In the conventional magnetic recording and reproducing apparatus, in addition to the inclusion of a capstan motor for driving the tape running device and the reels, there is also included a loading motor for loading the tape on the drum. As a result it is difficult to miniaturize and reduce the weight of the deck.

SUMMARY OF THE INVENTION

The present invention is intended to overcome the above-described disadvantages of the conventional devices.

Therefore, it is the object of the present invention to provide a power transferring device for a magnetic recording and reproducing apparatus, in which a capstan motor drives the tape running and loading systems, thereby eliminating the need for a separate loading motor and allowing the deck to be super-compact.

The power transferring device according to the present invention includes: a transmitting gear meshed with a gear rotated forward and reverse by a driving source so as to be pivoted around a shaft by a certain angle; a first gear selectively meshed with the transmitting gear for driving the loading system; and a second gear for driving the running system, wherein the lower portion of the shaft of the transmitting gear is coupled with a groove of a main chassis in such a manner as to regulate the moving range of the transmitting gear during the mesh of the first and second gears.

BRIEF DESCRIPTION OF THE DRAWINGS

The above object and other advantages of the present invention will become more apparent from the following description of a preferred embodiment thereof with reference to the attached drawings in which.

DESCRIPTION OF THE PREFERRED EMBODIMENT

Figure 1:
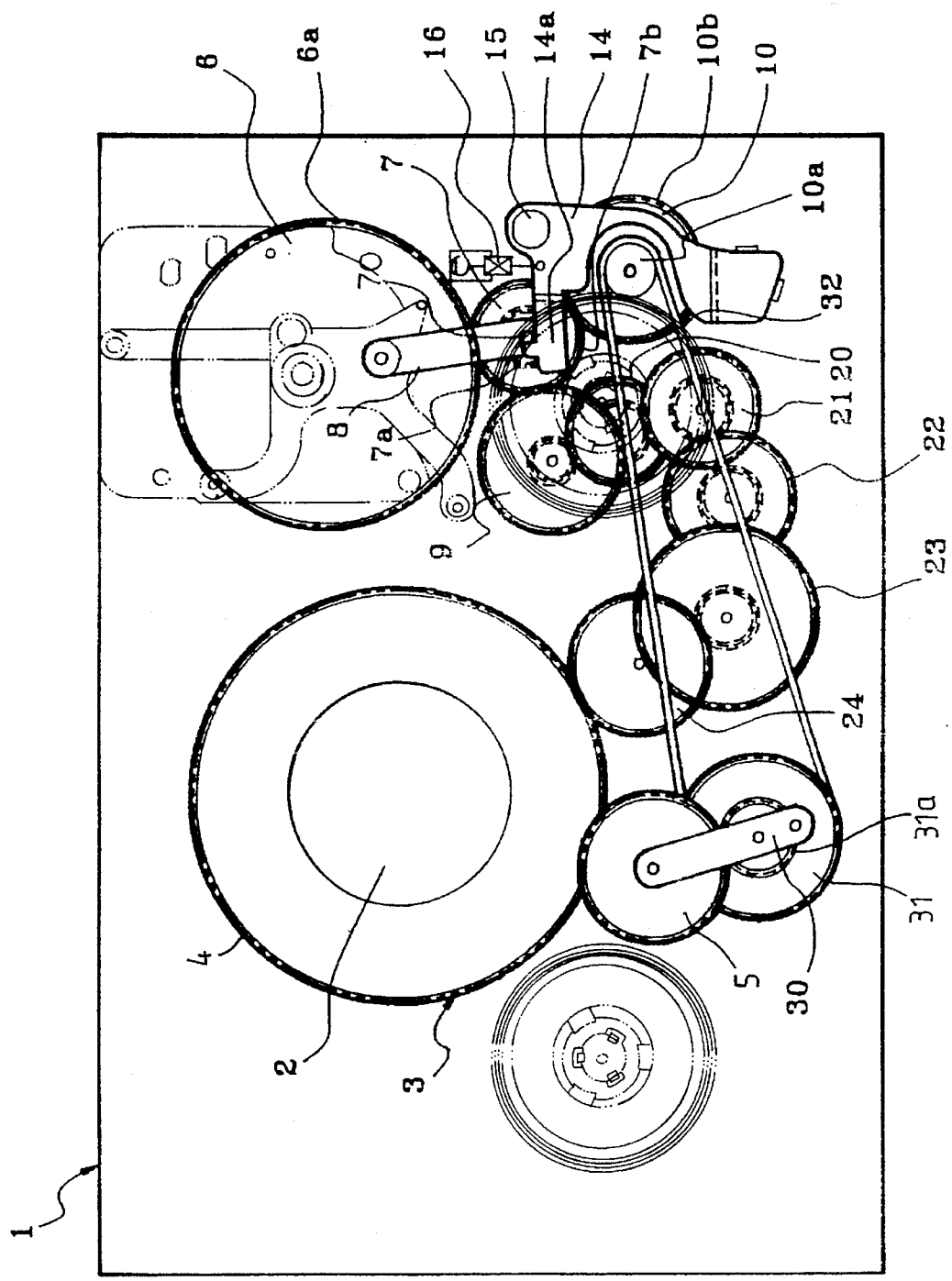
FIG. 1 is a schematic plan view of a power transferring device in accordance with a preferred embodiment of the present invention.

As seen in FIG. 1, a rotary drum 2 is installed at the center of a main chassis 1 of a magnetic recorder/reproduction device. The drum 2 is provided with a head (not shown) for recording and reproducing signals on and from a magnetic tape. Around the drum 2, there is installed a tape loading device 3. The tape loading device 3 is a ring gear (4) type, and during the revolution of the ring gear 4, a pole base (not shown) moves along a predetermined path, so that the tape is loaded on the drum. The latter operation and elements are conventional.

Further, a pair of reels (not shown), on which a tape cassette is placed, are installed on the main chassis 1, and the reels are driven by means of an idler 5. The tape loading device 3 and the idler 5 operate in such a manner that a capstan motor 6 installed on the main chassis 1 transmits its rotary power selectively via a power shifting means to load the tape or drive the reels.

Figure 2:
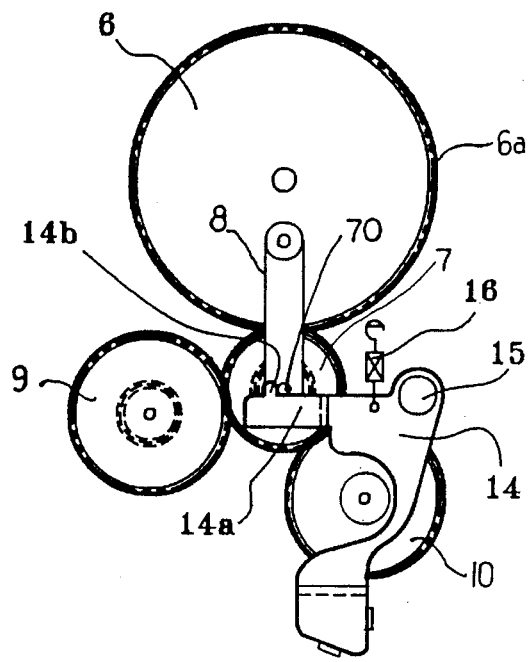
FIGS. 2 and 3 illustrate the constitution and operation of the power shifting device of FIG. 1.
Figure 3:
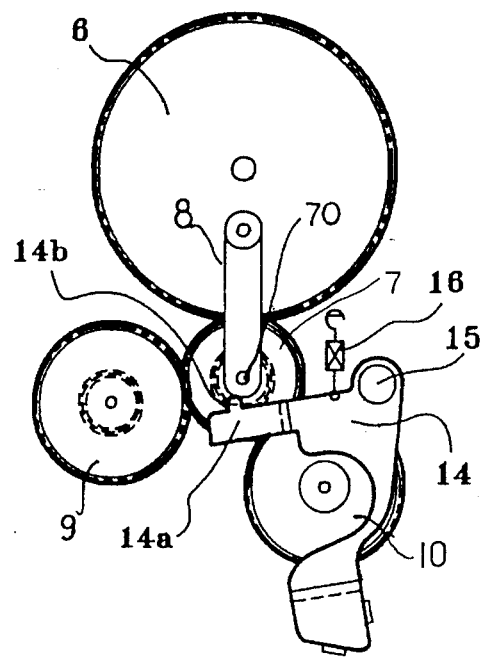

As shown in FIGS. 1 to 3, the power transferring means includes a transmitting gear 7, which meshes with a gear portion 6a of the capstan motor 6. The gear 7 is connected to a lever 8. The lever 8 is connected at its upper end to a bracket (not shown) that is attached to the chassis 1. The lever is allowed to pivot about its axis to swing the gear 7 to the left or the right to control the tape loading and the tape running, respectively. First and second gears 9 and 10 are installed at positions to mesh with the transmitting gear 7 on opposite sides thereof. As described below the gears 9 and 10 permit the power of the capstan motor to be transmitted through groups of gears, selectively, to the loading system or to the running system.

Figure 4A:
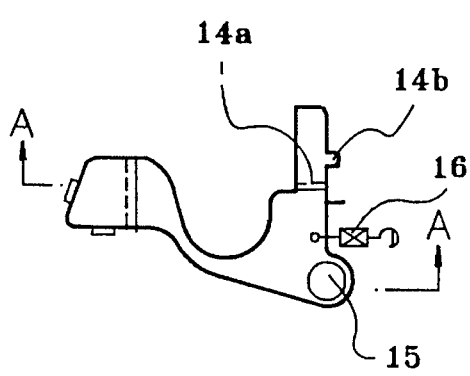
FIGS. 4a and 4b are plan and frontal views showing the plunger used in the present invention.
Figure 4B:
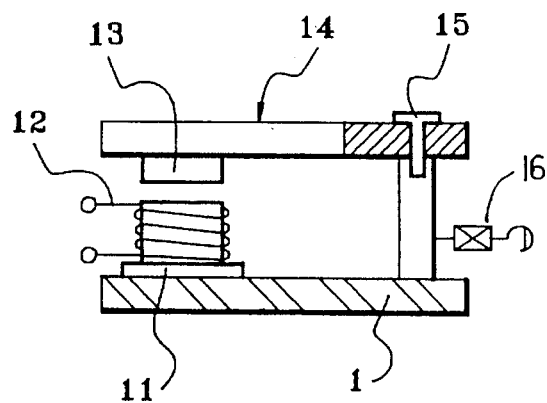

A plunger 14 is pivotally attached by a pin 15 to a shaft that is attached to the main chassis 1. A spring 16 is connected between an arm 14a of plunger 14 and the chassis to pull the arm clockwise, as seen in the drawings. An engaging piece 14b is formed on the tip of arm 14a. A permanent magnet 13 having N and S poles is secured to the underside of plunger 14. Facing the permanent magnet 13 is a driving coil 12 on a base plate 11 attached to the main chassis 1, as shown in FIGS. 4a and 4b. The engaging piece 14b engages a shaft 70 of the transmitting gear 7, and the shaft 70 also is coupled with the tip of the lever 8, as seen in FIG. 5.

The first gear 9 receives the power from the capstan motor 6 by means of the power shifting means as shown in FIG. 1 and transmits the power through a plurality of small gears 20–24 to the tape loading device 3, so that tape loading and unloading operations are possible. Under this condition, the teeth 7a of the gear 7 mesh with the first gear 9. The second gear 10, having teeth 10b on the circumference thereof, drives a driving pulley 10a, which is connected through a belt 32 to a driven pulley 31. The driven pulley 31 is connected through an arm 30 to the idler 5. A gear portion 31a of the driven pulley 31 is meshed with the idler 5, so that the power of the capstan motor 6 is transmitted to the reels to drive the reels and control the tape running operation.

Figure 5:
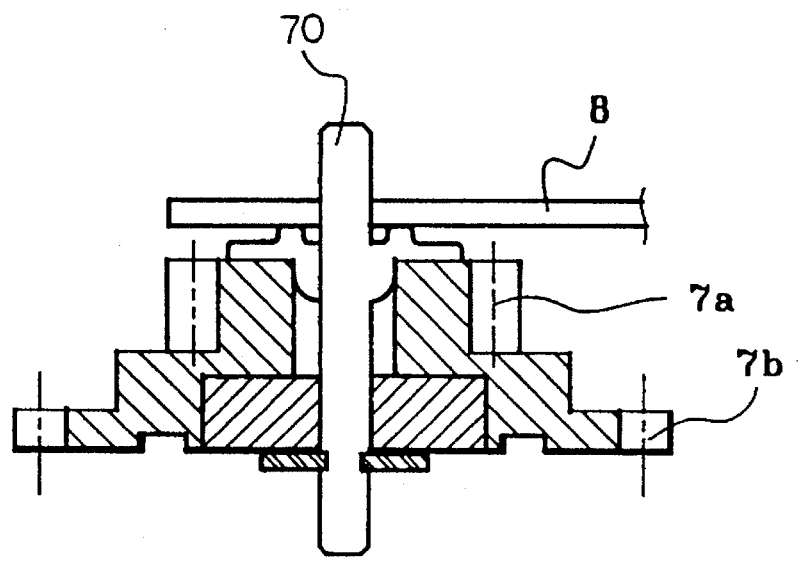
FIG. 5 illustrates the coupling of a transmitting lever and a pin.
Figure 6:
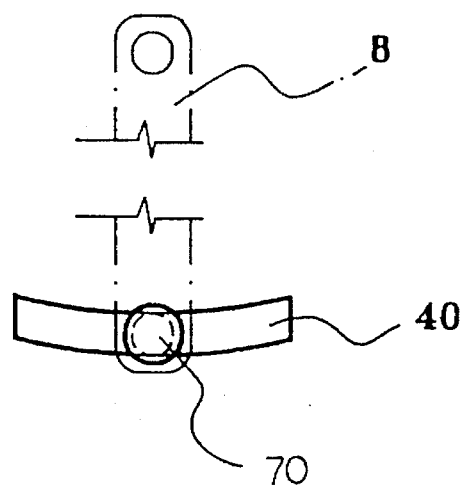
FIG. 6 is a schematic view showing the operation of the transmitting lever.

As shown in detail in FIGS. 5 and 6, the transmitting lever 8 is coupled to the upper portion of the shaft 70 of gear 7, and the lower portion of shaft 70 rides in a groove 40 in the main chassis 1 so as to be positionally regulated. That is, the lower portion of the shaft 70 of the transmitting gear 7 moves along the groove 40, which is formed on the main chassis 1. The transmitting gear 7 moves with its shaft 70 such that the power of the capstan motor 6 is selectively transmitted to either the gear 9 or the second gear 10.

The gear 7, with gear teeth 7a and 7b is selectively held and released by the plunger 14. When it is released its pivoting is controlled by the rotational direction of the capstan motor and gear 6. The gear 7 is shown held in FIGS. 1 and 2, whereas it is shown as released in FIG. 3.

When held in the position of FIG. 2, the gear 7 has its teeth meshed with the first gear 9. When the cassette is entered into the apparatus, tape loading begins in the conventional manner by rotation of the motor 6. In this case the motor 6 turns transmitting gear 7, which transfers the power of the motor to the tape loading system, including gears 20 through 24. During this time the plunger 14 holds the gear 7 in place by abutment of the arm 14a and engaging piece 14b of the plunger. Rotation of motor 6 in either direction will be transmitted to the loading/unloading system.

A sensor, not shown, senses when a tape cassette is properly placed in the device for operation and is fully loaded onto the drum. The electromagnetic coil 12 is energized temporarily to pull the plunger counterclockwise, against the bias of spring 16, and the motor 6 is started in the counterclockwise direction. As a result of the action of electromagnet 12, the plunger arm moves away from the shaft 70 of gear 7, allowing shaft 70 and gear 7 to freely move, guided by the shaft 70 in the groove 40. The counterclockwise rotation of motor 6 pivots the gear 7 to the right so as to bring the gear teeth 7b into contact with the second gear 10. The motor rotation then stops and the electromagnetic coil 12 is deenergized. As a result, the plunger 14 moves clockwise causing the arm 14a and engaging piece 14b to engage and hold the gear 7 in the position shown in FIG. 1. The gear is now in position to control the transfer of power from the capstan motor 6 to the tape running system.

During the positional regulation and release, the lower portion of the shaft 70 of the transmitting gear 7 runs along the groove 40 as shown in FIG. 6, so that the position regulating and releasing operations should be carried out.

As a result, as shown in FIG. 1, the power of the capstan motor 6 is transmitted through the belt 32 to the idler gear 5, which is meshed with the driven gear 31. Thus, the idler gear 5 is pivoted to the left and right in accordance with the revolution direction of the capstan motor 6 and, at the same time, the revolving power is selectively transmitted to the supply and take-up reels.

In a similar manner, the transmitting gear 7 is released and pivoted to the left to once again engage the first gear 9, so as to be in position to allow the motor 6 to control tape loading and unloading. In this case, when the plunger is pivoted counterclockwise by the action of coil 12, the motor is temporarily rotated clockwise to pivot the gear to the left, bringing teeth 7a into contact with the gear 9. Thereafter, coil 12 is deenergized and motor 6 is stopped resulting in the gear 7 being held in the position of FIG. 2, where it will transmit the rotation of motor 6 to the tape loading/unloading system.

According to the present invention as described above, the power of one capstan motor can be transmitted to the loading system and to the running system in a proper manner.

Particularly, the lower portion of the shaft of the transmitting gear moves along the groove which is formed on the main chassis with the result that the power can be transferred.

What is claimed is:

1. In a magnetic recording/reproducing apparatus of the type having a tape loading system driven by a first gear and a tape running system driven by a second gear, and a capstan motor, the improvement comprising:

a transmitting gear pivotally attached to a chassis for transferring power from said capstan motor to either said first gear or said second gear depending on a pivotal position of said transmitting gear, a track on said chassis for guiding the pivoting movement of said transmitting gear, a plunger for controlling the release and holding of said transmitting gear, and a motor gear that rotates with said capstan motor and meshes with said transmitting gear, whereby when said transmitting gear is not held in position by said plunger, the rotation of said capstan motor causes the pivoting of said transmitting gear so as to mesh directly with either said first gear or said second gear.

2. The apparatus of claim 1 wherein said plunger includes a pin pivotally holding said plunger to said chassis, an arm with an engaging piece thereon, and a spring attached to bias said arm in a direction to abut said transmitting gear and hold it in place, and an electromagnet positioned to overcome the bias of said spring when said electromagnet is energized to thereby pivot said plunger in an opposite direction and release said transmitting gear.

3. The apparatus of claim 2, wherein said transmitting gear further includes a shaft about which said transmitting gear rotates, and wherein said track is an arcuate groove in said chassis; said shaft of said transmitting gear riding in said groove to regulate the movement of said transmitting gear.

\* \* \* \* \*